Patented Jan. 30, 1940

2,188,319

UNITED STATES PATENT OFFICE 2,188,319

ADSORBATE AND METHOD OF MAKING THE SAME

Gustav F. Siemers, Berkeley, Calif., assignor, by direct and mesne assignments, of one-half to McKesson & Robbins, Inc., Bridgeport, Conn., a corporation of Connecticut, and one-half to The Vitab Corporation, a corporation of California No Drawing. Application May 28, 1937, Serial No. 145,295

6 Claims. (Cl. 99—11)

My invention relates to vitamin adsorbates containing antioxidant properties, and particularly to a means of preserving the potency of vitamin A and a method of providing a product having a preservative action for vitamin A.

My invention is concerned particularly with the preservation of vitamins, such as vitamin A, obtained from fish liver oils, and sometimes including also vitamin D. When vitamin A, either with or without vitamin D, is dispensed in elastic capsules or in concentrated form compressed into tablets, it is subject to material loss of potency and gross deterioration by oxidation during storage. Various antioxidants, such as hydroquinone and the like, have been utilized, but it is an object of my invention to provide a means of maintaining the potency of vitamin A without the addition of material which is of little or no therapeutic value from the vitamin adsorbate or concentrate standpoint.

An object of my invention is to provide a product containing vitamin A, in which there is no material loss of potency over a protracted period of time.

Another object of my invention is to provide a process of making vitamin A available without material loss of potency over a protracted period of time.

A further object of my invention is in general to improve vitamin A-containing products and the processes of obtaining the same.

Vitamin A is usually supplied in commerce very much as it is found, either in natural or in fortified or concentrated form, in fish liver oils which likewise contain vitamin D. All of the vitamins are usually medically administered in therapeutic doses. In order to provide a balanced intake of vitamins, it is also customary to administer, with vitamin A, other vitamins, such as B or $B_1$ and G or $B_2$. If vitamins B or $B_1$ and G or $B_2$ are derived from an ordinary source, such as yeast, and then combined with fish oil by adsorption upon fuller's earth, there is a material destruction of vitamin A, even in twenty-four hours, so that, although the therapeutic balance of all of the vitamin constituents may have initially been very carefully determined and calculated, the balance is partially destroyed and disrupted in as short a period as overnight, and the expected intake of vitamin A is reduced by oxidation far below an appropriate amount with respect to the quantity of other vitamins present in the dosage.

In accordance with my invention, I have discovered that by making an aqueous extract of vitamins B or $B_1$ and G or $B_2$ from a cereal source, such as from rice bran or comparable cereals, I likewise extract with the vitamins B or $B_1$ and G or $B_2$ an antioxidant which is adsorbed with the vitamins B or $B_1$ and G or $B_2$ on fuller's earth, and which, when combined with vitamin A bearing fish oils, acts as a suitable antioxidant so that the vitamin A potency is not appreciably diminished even after a very protracted period of time. As a matter of fact, there appears to be no measurable destruction of vitamin A potency.

I have also discovered that this antioxidant may be precipitated and concentrated from the aqueous extract of cereal brans by adding sufficient hydrochloric, sulphuric or any other suitable acid to adjust the hydrogen ion concentration of the extract to pH 3.0 to 5.0. It is preferable, but not entirely necessary, to effect this precipitation after the albumino-proteins have been coagulated by heat and removed from the extract by filtration.

I have also discovered that this antioxidant can be removed from the adsorbates by washing with either hot or cold water. The antioxidant which is then suspended in the wash water can be removed by filtration and dried in hot air dryers at 60° C. No appreciable amount of the vitamin potency is removed from the fuller's earth adsorbate in the washing process, but the antioxidant itself is made available for use.

In following the process of my invention to arrive at the product, I preferably make an aqueous extract of vitamins B or $B_1$ and G or $B_2$ from any suitable cereal source, such as rice bran, wheat germ, rice polish or the like, and take such aqueous extract and mix it with a suitable adsorbent, such as fuller's earth or similar earthy material such as bentonite, silica gel, diatomaceous earth, or any of the pharmaceutical clays, so that the vitamins B or $B_1$ and G or $B_2$ are adsorbed on the earth. Apparently accompanying, or simultaneous with, such vitamin adsorption is a deposit on the fuller's earth of a naturally occurring antioxidant derived from the cereal source of the vitamins. The fuller's earth, with the vitamins B or $B_1$ and G or $B_2$ adsorbed thereon, together with and carrying the antioxidant, when mixed with a fish liver oil containing vitamin A and possibly vitamin D provides a product in which the balance of the various vitamins in a pharmaceutical dosage can be accurately established and will be maintained for long periods since the vitamin A is prevented from oxidizing and losing its potency by the naturally occurring antioxidant adsorbed on the fuller's earth.

This result can be checked by combining plain fuller's earth with vitamin A and fish oil, whereupon a marked destruction of vitamin A occurs in twenty-four hours; or by preparing a fuller's earth adsorbate of vitamins B or $B_1$ and G or $B_2$ from yeast and combining it with vitamin A in fish oil or fish liver oil concentrate, whereupon a marked deterioration occurs in twenty-four hours. But according to the process and product of my invention, no deterioration occurs within that time, thus indicating the derivation from a cereal source of a vitamin A preserving material.

To further demonstrate that the antioxidant is extracted from cereal sources and that the preservative action is not the result of the vitamin B or $B_1$ and G or $B_2$, a fuller's earth adsorbate of crystalline vitamin B or $B_1$ and crystalline vitamin G or $B_2$ (flavin) when combined with vitamin A in fish oil or fish liver oil concentrate produces a marked destruction of vitamin A within twenty-fours hours.

I claim:

1. A vitamin composition comprising a solid adsorbent material having adsorbed thereon a material containing vitamin A and an aqueous extract of a cereal providing an available vitamin B constituent and an antioxidant for the vitamin A.

2. A vitamin composition comprising a material containing available vitamin A derived from a fish liver oil, admixed with an antioxidant comprising the solid phase removed upon washing an adsorbing material carrying, as an adsorbate, an aqueous extract of a cereal.

3. In a method of preparing a stable, therapeutically useful vitamin composition in which constituent but different vitamins retain their potency, the steps of extracting from a cereal the aqueous soluble constituents thereof including a vitamin B constituent, treating said extract with an adsorbent to adsorb therefrom said vitamin B constituent and a vitamin A antioxidant, and adding a vitamin A-containing material to said solid adsorbent to provide said composition.

4. The method of protecting vitamin A against destructive oxidation, comprising admixing with a material containing potent vitamin A an adsorbent carrying as an adsorbed phase a portion of an aqueous cereal extract.

5. A vitamin composition comprising a solid adsorbent material having adsorbed thereon a material containing vitamin A and vitamins B and G from an aqueous extract of a cereal providing available vitamin B and G constituents and an antioxidant for the vitamin A.

6. In a method of preparing a stable, therapeutically useful vitamin composition in which different vitamins retain their potency, the steps of extracting from a cereal the aqueous soluble constituents thereof including vitamin B and G constituents, treating said extract with an adsorbent to adsorb therefrom said vitamin B and G constituents and a vitamin A antioxidant, and adding a vitamin A-containing material to said solid adsorbent to provide said composition.

GUSTAV F. SIEMERS.